(12) United States Patent
Itou

(10) Patent No.: US 10,648,698 B2
(45) Date of Patent: May 12, 2020

(54) SECURING FIXTURE FOR PHOTOVOLTAIC CELL MODULE

(71) Applicant: Solar Frontier K.K., Minato-ku, Tokyo (JP)

(72) Inventor: Daisuke Itou, Tokyo (JP)

(73) Assignee: Solar Frontier K.K. (JP)

( * ) Notice: Subject to any disclaimer, the term of this patent is extended or adjusted under 35 U.S.C. 154(b) by 0 days.

(21) Appl. No.: 16/313,851

(22) PCT Filed: Apr. 7, 2017

(86) PCT No.: PCT/JP2017/024435
§ 371 (c)(1),
(2) Date: Dec. 27, 2018

(87) PCT Pub. No.: WO2018/008620
PCT Pub. Date: Jan. 11, 2018

(65) Prior Publication Data
US 2019/0158012 A1    May 23, 2019

(30) Foreign Application Priority Data
Jul. 5, 2016  (JP) ................................. 2016-133647

(51) Int. Cl.
*F24S 25/63* (2018.01)
*F24S 25/67* (2018.01)
(Continued)

(52) U.S. Cl.
CPC ............... *F24S 25/63* (2018.05); *F24S 25/20* (2018.05); *F24S 25/632* (2018.05);
(Continued)

(58) Field of Classification Search
CPC .......... H02S 20/00; H02S 20/20; H02S 20/22; H02S 20/23; H02S 20/24; H02S 30/00;
(Continued)

(56) References Cited

U.S. PATENT DOCUMENTS 8,344,239 B2 * 1/2013 Plaisted ................. F24S 25/35
136/251
8,557,081 B2 * 10/2013 Sha ....................... F24S 25/615
156/281

(Continued)

FOREIGN PATENT DOCUMENTS

| JP | 2013/160026 A | 8/2013 |
| JP | 5653483 B2 | 11/2014 |
| JP | 2016/067153 A | 4/2016 |

*Primary Examiner* — Andrew J Triggs

(57) ABSTRACT

A securing fixture for a photovoltaic cell module that includes a first frame member that extends in a first direction; and a second frame member that extends in a second direction and is adjacent to the first frame member, the second direction being orthogonal to the first direction, the securing fixture being enclosed by a frame member having a corner portion formed by the first frame member and the second frame member. The securing fixture includes an abutting part that is fixed to a trestle and abuts on the trestle; and a holding part that holds the photovoltaic cell module, including a first protrusion that protrudes in a direction opposite to the abutting part, and abuts on an inner surface of the corner portion of the frame member, and a placing part on which the second frame member is placed.

13 Claims, 13 Drawing Sheets

(51) Int. Cl.
    F24S 25/634      (2018.01)
    H02S 30/00       (2014.01)
    F24S 25/20       (2018.01)
    H02S 20/23       (2014.01)
    F24S 25/632      (2018.01)
(52) U.S. Cl.
    CPC ............ *F24S 25/634* (2018.05); *F24S 25/67*
        (2018.05); *H02S 20/23* (2014.12); *H02S 30/00*
                    (2013.01); *Y02B 10/12* (2013.01)
(58) Field of Classification Search
    CPC .......... F24S 25/60; F24S 25/63; F24S 25/632;
                F24S 25/67; F24S 25/20; Y02B 10/12
    See application file for complete search history.

(56)             References Cited

U.S. PATENT DOCUMENTS

| | | | | |
|---|---|---|---|---|
| 8,806,813 | B2* | 8/2014 | Plaisted | H01R 4/64 |
| | | | | 52/173.3 |
| 9,035,176 | B2* | 5/2015 | Keller | H01R 4/64 |
| | | | | 174/51 |
| 9,093,584 | B2* | 7/2015 | Kanbara | H01L 31/042 |
| 9,214,891 | B2* | 12/2015 | Dickey | H02S 20/24 |
| 9,431,953 | B2* | 8/2016 | Stearns | H02S 20/23 |
| 9,473,066 | B2* | 10/2016 | Stephan | H02S 20/23 |
| 9,595,772 | B2* | 3/2017 | Haney | H01R 43/027 |
| 10,090,800 | B2* | 10/2018 | McPheeters | H02S 20/30 |
| 10,298,169 | B2* | 5/2019 | Martin | F16B 2/005 |
| 2011/0260027 | A1* | 10/2011 | Farnham, Jr. | H02S 20/00 |
| | | | | 248/309.1 |
| 2012/0192926 | A1* | 8/2012 | Kambara | H02S 20/23 |
| | | | | 136/251 |
| 2013/0102165 | A1* | 4/2013 | DuPont | H02S 40/36 |
| | | | | 439/95 |
| 2014/0000085 | A1* | 1/2014 | Teller | B25B 7/123 |
| | | | | 29/426.6 |
| 2014/0174510 | A1* | 6/2014 | Kanbara | F16B 5/0607 |
| | | | | 136/251 |
| 2014/0291462 | A1* | 10/2014 | Kanczuzewski | H01L 31/042 |
| | | | | 248/237 |
| 2014/0294493 | A1* | 10/2014 | Cavieres | F16B 2/241 |
| | | | | 403/327 |
| 2014/0319307 | A1* | 10/2014 | Schrock | F16B 9/023 |
| | | | | 248/542 |
| 2015/0000725 | A1* | 1/2015 | Reilly | H02S 20/00 |
| | | | | 136/251 |
| 2015/0107168 | A1* | 4/2015 | Kobayashi | H02S 20/23 |
| | | | | 52/173.3 |
| 2015/0263666 | A1* | 9/2015 | Powers, III | F16B 2/065 |
| | | | | 136/251 |
| 2015/0288320 | A1* | 10/2015 | Stearns | H02S 20/23 |
| | | | | 52/173.3 |
| 2016/0134229 | A1* | 5/2016 | Hsueh | H02S 20/23 |
| | | | | 52/173.3 |
| 2016/0164452 | A1* | 6/2016 | Wentworth | H02S 20/23 |
| | | | | 52/173.3 |
| 2016/0164455 | A1* | 6/2016 | Kanbara | H02S 20/23 |
| | | | | 136/251 |
| 2016/0173024 | A1* | 6/2016 | Itou | H02S 30/10 |
| | | | | 136/251 |
| 2019/0158012 | A1* | 5/2019 | Itou | H02S 20/23 |

* cited by examiner

SECURING FIXTURE FOR PHOTOVOLTAIC CELL MODULE

RELATED APPLICATIONS AND FOREIGN PRIORITY CLAIM

This application is a 35 U.S.C. § 371 national stage application, which claims priority to International PCT Application No. PCT/JP2017/024435, filed on Jul. 4, 2017, which claims priority to Japanese Patent Application No. 2016-133647, filed on Jul. 5, 2016, each of which is incorporated by reference herein in their entirety.

FIELD OF THE INVENTION

The disclosure herein generally relates to a securing fixture for a photovoltaic cell module.

DESCRIPTION OF RELATED ART

Photovoltaic cell modules are arranged on a roof for a house or a factory, or arranged on the ground in the case of mega solar power generation.

In the case of a sloping roof, photovoltaic cell modules are installed along a slope of the roof. In the case of a flat roof, typically, a plurality of photovoltaic cell module lines, in which photovoltaic cell modules are set to have a slope from a horizontal plane by a few degrees, are arranged along the roof. Also in the case of installing photovoltaic cell modules on the ground, a plurality of photovoltaic cell module lines, in which photovoltaic cell modules are set to have a slope from a horizontal plane by a few degrees, are arranged along the ground.

A photovoltaic cell module is typically supported by a trestle, and installed on a roof or on the ground. Even on a roof for a house, ten or more sheets of photovoltaic cell modules are used. For mega solar power generation, several tens of thousands of sheets of photovoltaic cell modules may be used. Thus, a positioning upon installation of a photovoltaic cell module is quite important. Patent Document 1 discloses an example of a securing fixture that can position a photovoltaic cell module and fix the photovoltaic cell module to a trestle.

The securing fixture disclosed in Patent Document 1 is used when photovoltaic cell modules are arranged from a downstream side to an upstream side on a sloping roof. The securing fixture includes a first member fixed to a trestle; a second member located above the first member and having a supporting part for supporting a rear surface of the photovoltaic cell module; and a third member located above the second member and having a clamping part for clamping the photovoltaic cell module in a thickness direction (front and rear surface direction) along with the supporting part of the second member and having a projection part for adjusting an interval between adjacent photovoltaic cell modules.

The securing fixture is fixed to the trestle, and a downstream side end portion of the photovoltaic cell module is fixed to the securing fixture. At this time, the projection part of the third member is fixed so as to be located between side parts of the adjacent photovoltaic cell modules. Thus, an interval between the adjacent photovoltaic cell modules is kept constant.

SUMMARY OF THE INVENTION

Technical Problem

When a photovoltaic cell module is installed on a flat roof or on the ground, a plurality of photovoltaic cell module lines, in which photovoltaic cell modules are set to have a slope from a horizontal plane by a few degrees, are arranged along the horizontal plane. Moreover, adjacent photovoltaic cell module lines may be arranged so as to be symmetric with respect to a line vertically down from a point between upstream side end portions (chevron-like).

In the aforementioned case, taking into account an arrangement position of a trestle or an arrangement position of the photovoltaic cell modules, it is preferable to position the photovoltaic cell module by the upstream side end portion and fix, from a viewpoint of working efficiency. Moreover, another reason why it is preferable to position the photovoltaic cell module by the upstream side end portion and fix is that when a securing fixture is arranged on the downstream side of the photovoltaic cell module, rain water or the like may flow down the securing fixture into a trestle, and reduce a durability of the trestle.

However, a securing fixture disclosed in Patent Document 1 is installed on a downstream side, and positions and fixes a photovoltaic cell module by regulating a motion of the photovoltaic cell module in two directions, i.e. toward the downstream side of the photovoltaic cell module and toward a projection part. Thus, the securing fixture has a configuration in which the photovoltaic cell module cannot be positioned and fixed on the upstream side.

In view of the aforementioned problem, the present invention aims at providing a securing fixture for a photovoltaic cell module, that positions and fixes the photovoltaic cell module on an upstream side, and thereby a working efficiency is enhanced and a durability of a trestle can be maintained.

Solution to Problem

According to an aspect of the present invention, a securing fixture is for a photovoltaic cell module that includes a first frame member that extends in a first direction; and a second frame member that extends in a second direction and is adjacent to the first frame member, the second direction being orthogonal to the first direction, the securing fixture being enclosed by a frame member having a corner portion formed by the first frame member and the second frame member.

The securing fixture incudes an abutting part that is fixed to a trestle and abuts on the trestle; and a holding part that holds the photovoltaic cell module, including a first protrusion that protrudes in a direction opposite to the abutting part, and abuts on an inner surface of the corner portion of the frame member, and a placing part on which the second frame member is placed.

Effect of Invention

According to an aspect of the present invention, a securing fixture for a photovoltaic cell module, that positions and fixes the photovoltaic cell module on an upstream side, and thereby a working efficiency is enhanced and a durability of a trestle can be maintained, can be provided.

DETAILED DESCRIPTION OF THE PREFERRED EMBODIMENTS

Figure 1:
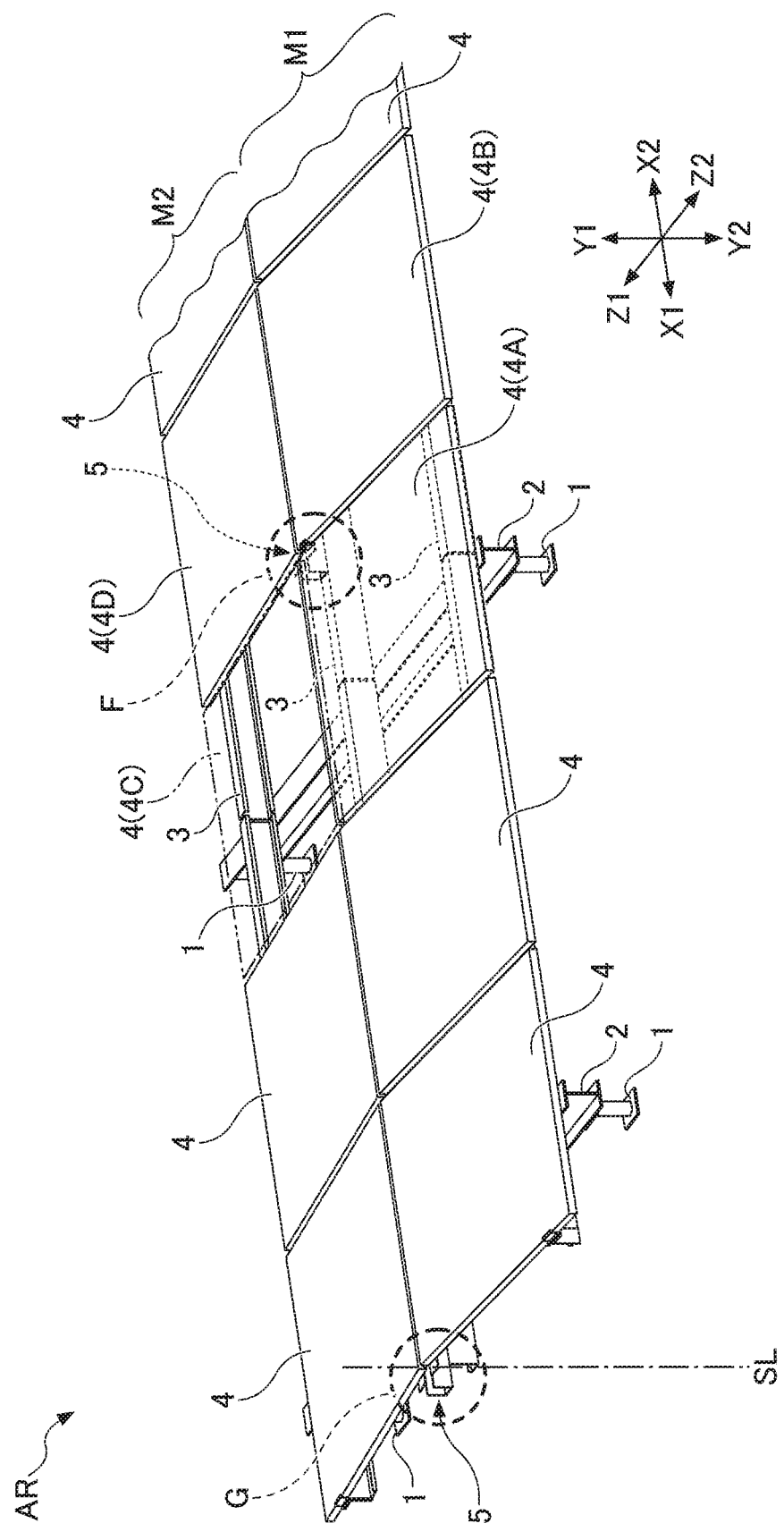
FIG. 1 is a perspective view schematically depicting an example of a photovoltaic cell module array, in which a securing fixture for a photovoltaic cell module according to a first embodiment was implemented, installed on the ground plane.

In the following, with reference to drawings, embodiments of the present invention will be described. In each drawing, the same reference numeral is assigned to the same component, and redundant explanation may be omitted.

First Embodiment

Figure 2:
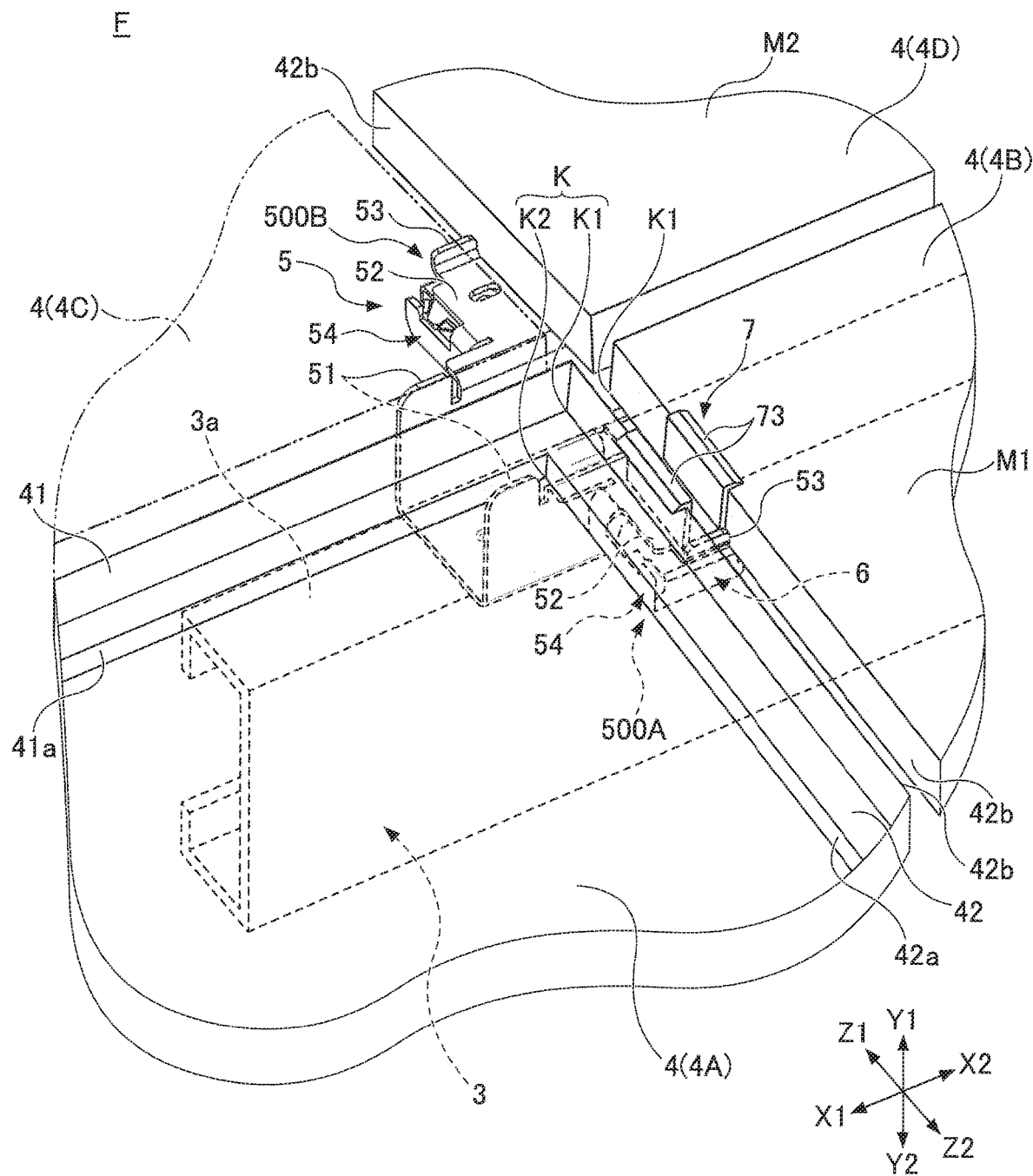
FIG. 2 is a partially enlarged perspective view of a part "F" in FIG. 1.

FIG. 1 is a perspective view schematically depicting an example of a photovoltaic cell module array, in which a securing fixture for a photovoltaic cell module according to a first embodiment was implemented, installed on the ground plane. FIG. 2 is a partially enlarged perspective view depicting an installation state of the securing fixture for a photovoltaic cell module in a part "F", illustrated in FIG. 1. In FIG. 2, for convenience of explanation, on an arrow X1 side, a photovoltaic cell module 4 (4C) of an arrow Z1 side will be omitted, and also on the arrow X1 side, a photovoltaic cell module 4 (4A) of an arrow Z2 side will be illustrated as a transparent view.

FIG. 1 depicts a state where a securing fixture 5 for a photovoltaic cell module 4 according to the embodiment is implemented in a photovoltaic cell module array AR formed on the ground. However, the present invention is not limited to the state on the ground, but can be similarly implemented also in a case of forming a photovoltaic cell module array on a flat roof or a sloping roof.

In the photovoltaic cell module array AR, illustrated in FIG. 1, two photovoltaic cell module lines, M1 and M2, in which photovoltaic cell modules are set to have a slope from a horizontal plane by a few degrees, are arranged adjacent to each other on the arrow Z1 side and the arrow Z2 side, so as to be symmetric with respect to a line SL vertically down from a point between upstream side end portions of photovoltaic cell modules 4 adjacent to each other on the arrow Z1 side and the arrow Z2 side (chevron-like).

In the specification, a longitudinal direction of the photovoltaic cell module line M1 (or M2) indicates the arrow X1–arrow X2 direction. A transverse direction of the photovoltaic cell module line M1 (or M2) indicates the arrow Z1–arrow Z2 direction.

The photovoltaic cell module array AR includes a base 1, a support rail 2, a trestle 3, a photovoltaic cell module 4, and a securing fixture 5.

The base 1 has an anchor portion that is buried in the ground, and can be connected to the support rail 2.

The support rail 2 is, for example, formed by an H-type steel beam, and arranged along the transverse direction (arrow Z1 to Z2) of a photovoltaic cell module line M1. Moreover, the plurality of adjacent support rails 2 are arranged along the longitudinal direction of the photovoltaic cell module line M1 at a constant interval.

The trestle 3, is for example, formed by a C-type steel beam, and arranged above an upper surface of the support rail 2, and along a direction orthogonal to the support rail 2 (direction of arrow X1 to arrow X2). Moreover, the plurality of adjacent trestles 3 are arranged along the transverse direction of the photovoltaic cell module line M1 (direction of arrow Z1 to arrow Z2) at a constant interval.

The photovoltaic cell module 4 has at least one corner portion, and is formed in a rectangular shape, in which an outer periphery of a panel part 4a is enclosed by a frame member 40.

The frame member 40 has a horizontal edge 41 that is a first frame member extending in a first direction (direction of arrow X1 to arrow X2), and a vertical edge 42 that is a second frame member extending in a direction orthogonal to the first direction (direction of arrow Z1 to arrow Z2). The frame member 40 is formed in a rectangular shape by a pair of horizontal edges 41 and a pair of vertical edges 42. A corner portion K is formed by the horizontal edge 41 and the vertical edge 42 that is adjacent to the horizontal edge 41.

Figure 3:
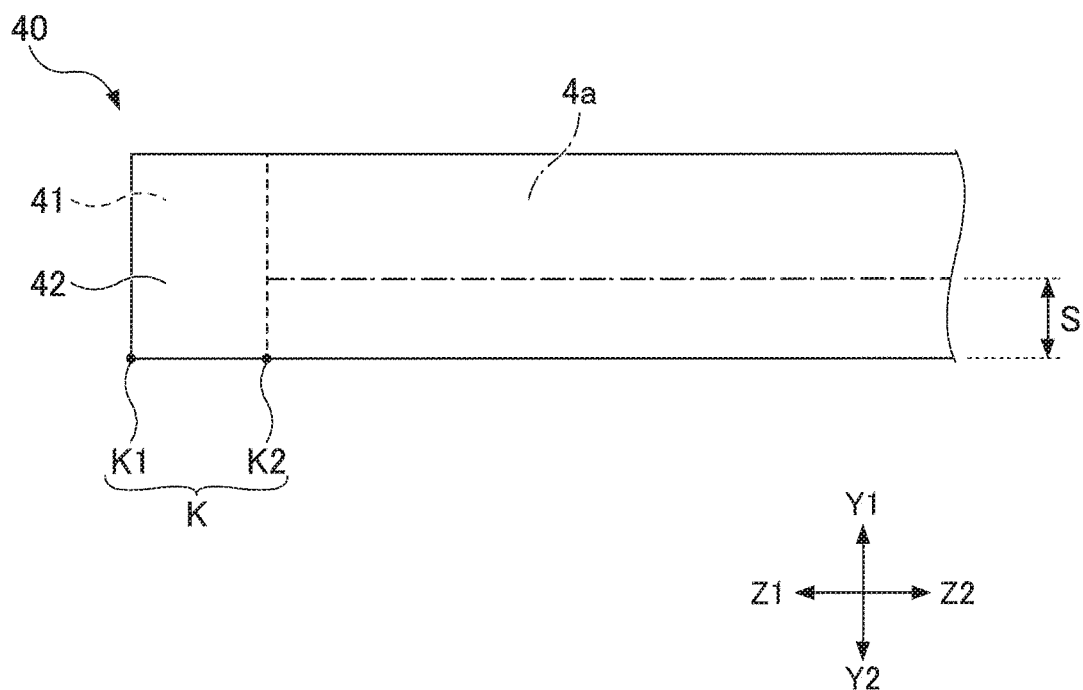
FIG. 3 is a partial side view for describing a relation between a panel part and a frame member of the photovoltaic cell module.

FIG. 3 is a partial side view of the photovoltaic cell module 4. FIG. 3 is a diagram for describing a corner portion K of the photovoltaic cell module 4.

FIG. 3 corresponds to a side view of the vertical edge 42. In the drawing, a portion where a panel part 4a is arranged is indicated by a dot-dashed line. Moreover, in the drawing, a portion where the horizontal edge 41 is arranged is indicated by a dashed line. The horizontal edge 41 has the same thickness as the vertical edge 42. The frame member 40 is formed to have a greater thickness than the panel part 4a, as illustrated in FIG. 3. Particularly, a gap S is formed between a lower end portion of the frame member 40 and a lower surface of the panel part 4a. Thus, in the embodiment, the corner portion K formed by the horizontal edge 41 and the vertical edge 42, which are adjacent to each other, includes an outer corner portion K1 formed outside the frame member 40, and an inner corner portion K2 formed in the gap inside the frame member 40.

The frame member 40 having a rectangular shape according to the embodiment has corner portions K at four locations by the horizontal edges 41 and the vertical edges 42, and the outer corner portions K1 and the inner corner portions K2 are also formed at four locations.

Among the inner corner portions K2 at four locations of the frame member 40, the inner corner portion K2 located in the upstream side end portion of the photovoltaic cell module 4 is used for positioning and fixing of the securing fixture 5, which will be described later.

Note that one of the inner corner portions K2 of the photovoltaic cell module 4 according to the embodiment is used for the positioning and fixing by being caught by the first protrusion 51 of the securing fixture 5, which will be described later in detail.

Securing Fixture

Figure 4:
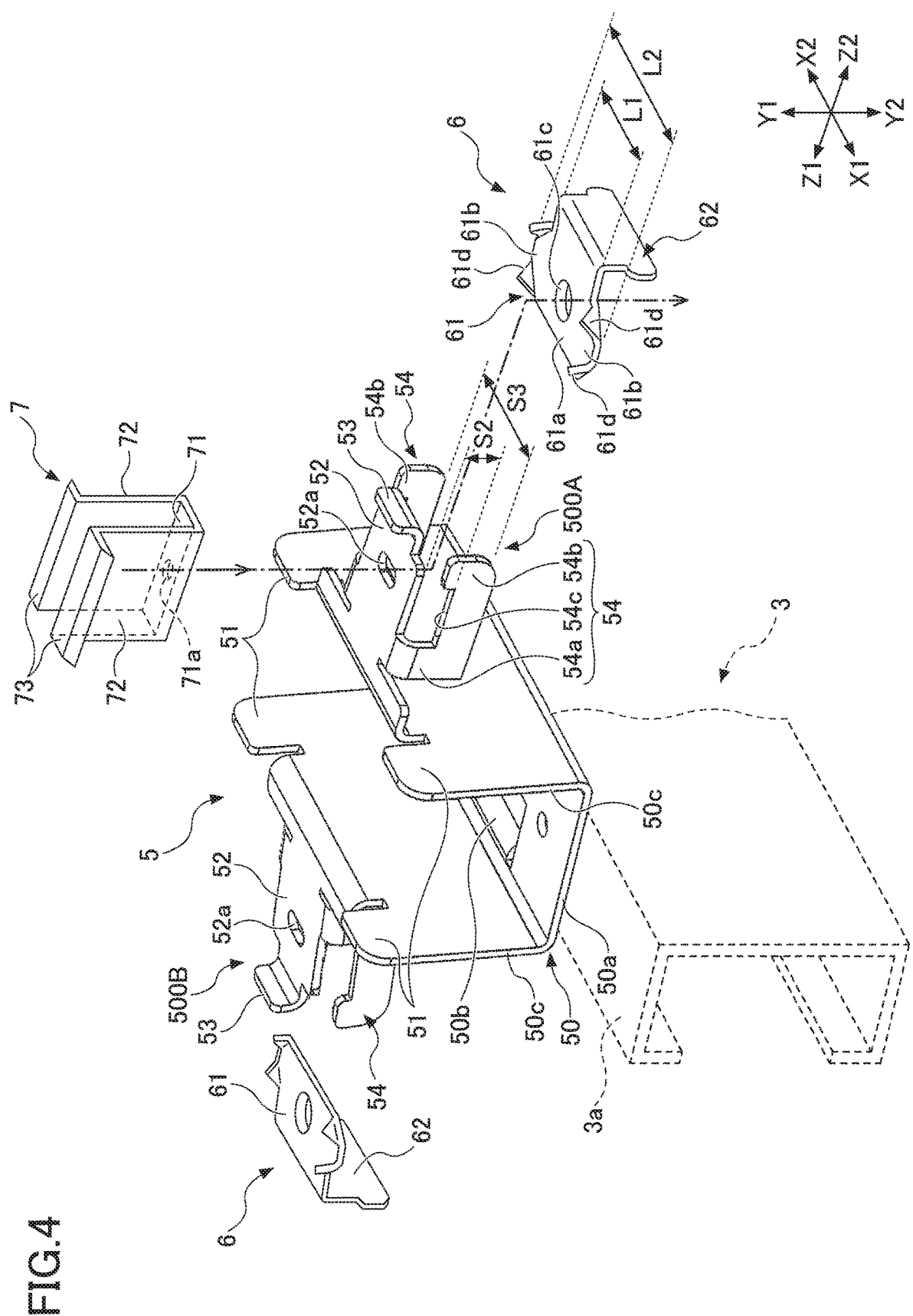
FIG. 4 is an exploded perspective view for describing a configuration of the securing fixture for a photovoltaic cell module according to the first embodiment.
Figure 5A:
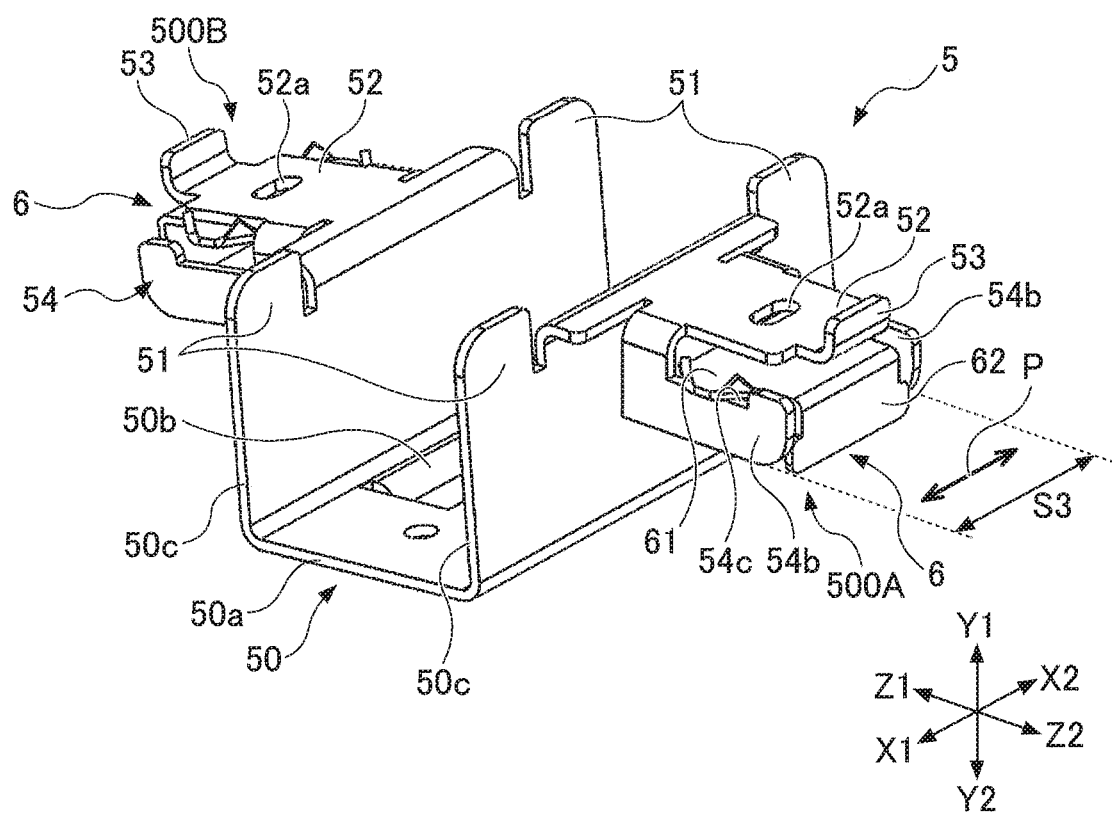
FIG. 5A is a top perspective view for describing the securing fixture for a photovoltaic cell module according to the first embodiment.
Figure 5B:
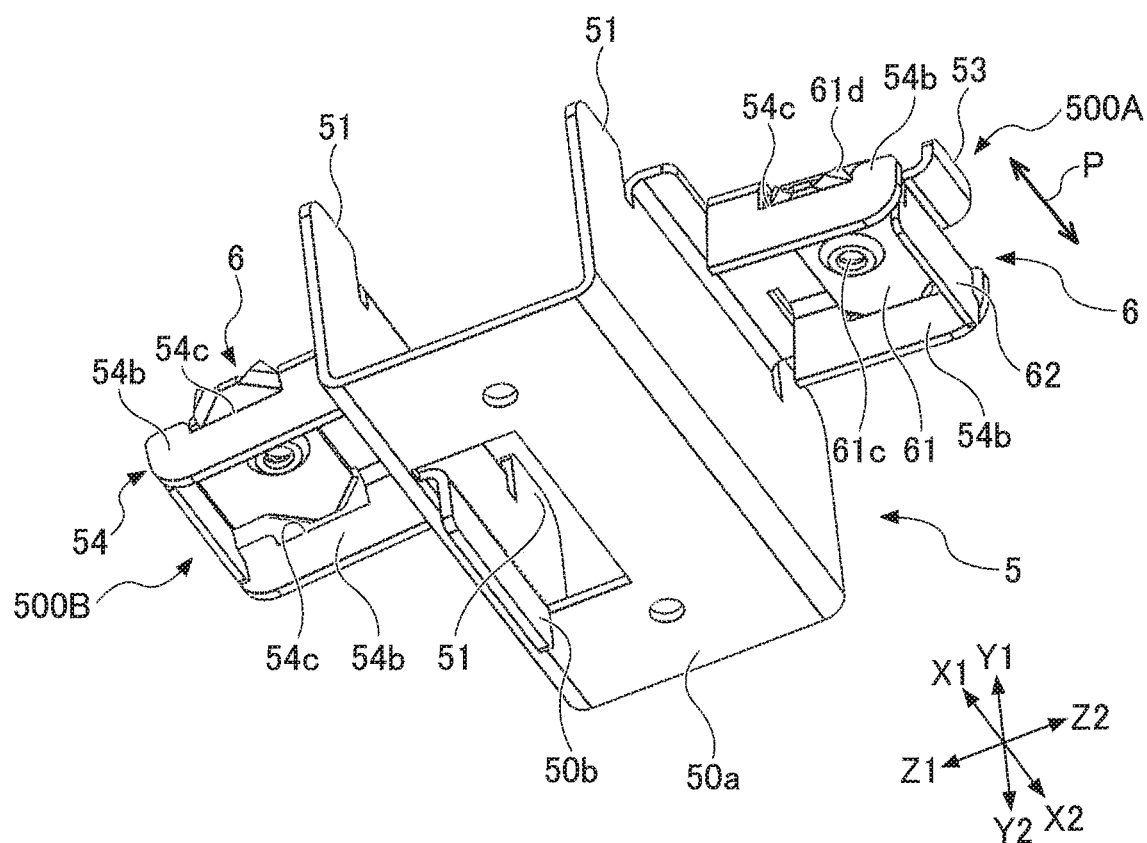
FIG. 5B is a bottom perspective view of FIG. 5A.
Figure 6:
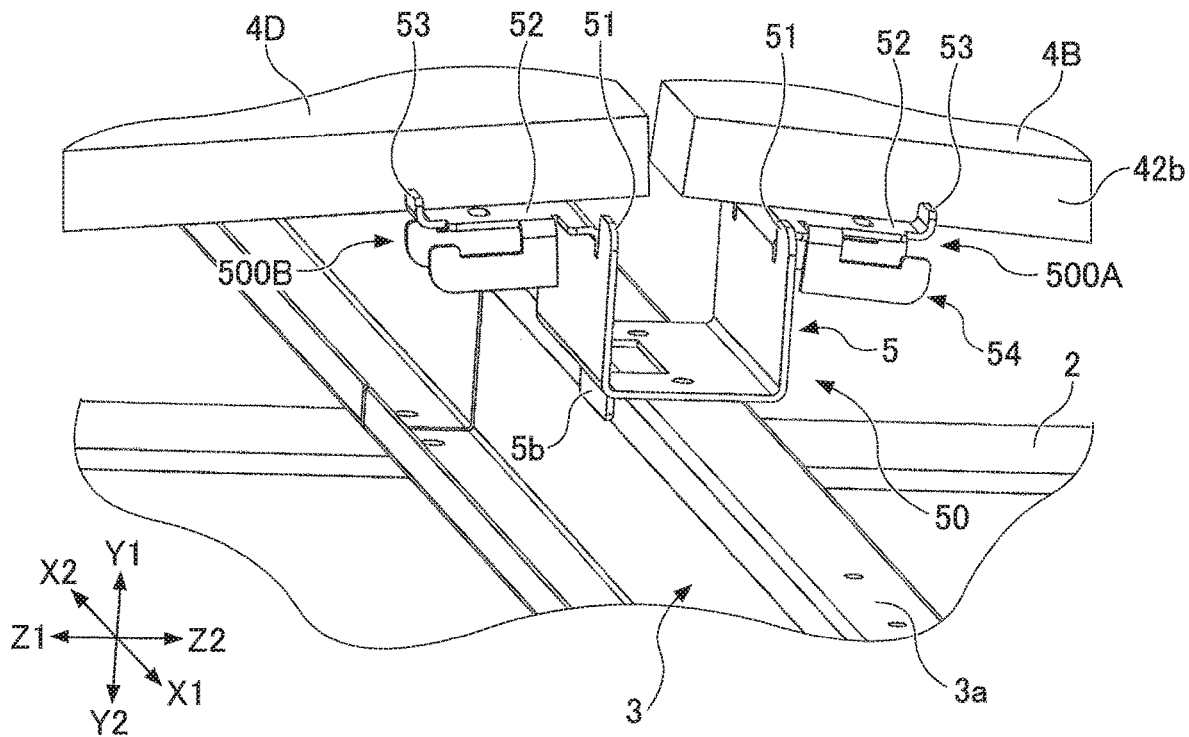
FIG. 6 is a partially enlarged perspective view for describing a relation between the securing fixture for a photovoltaic cell module according to the first embodiment and a trestle.

Next, with reference to FIGS. 1 to 6, the securing fixture 5 of the photovoltaic cell module 4 according to the embodiment will be described. FIG. 4 is an exploded perspective view for describing a configuration of the securing fixture 5 for a photovoltaic cell module 4 according to the first embodiment. FIG. 5A is a top perspective view for describing the securing fixture 5 for the photovoltaic cell module 4 according to the first embodiment. FIG. 5B is a bottom perspective view of FIG. 5A. Note that in FIGS. 5A and 5B, for convenience of explanation, a clamp 7, which will be described later, is omitted. FIG. 6 is a partially enlarged perspective view for describing a relation between the securing fixture 5 for the photovoltaic cell module 4 according to the first embodiment and a trestle 3. Note that in FIG. 6, for convenience of explanation, the clamp 7 and a supporting member 6, which will be described later, are omitted.

The securing fixture 5 for a photovoltaic cell module according to the embodiment is a member that can position and fix a first photovoltaic cell module 4A and a second photovoltaic cell module 4B, which are adjacent to each other in the longitudinal direction of the photovoltaic cell module line M1 in the portion "F" in FIGS. 1 and 2, and a third photovoltaic cell module 4C and a fourth photovoltaic cell module 4D, which are respectively adjacent to upstream sides of the first photovoltaic cell module 4A and the second photovoltaic cell module 4B, and which are adjacent to each other in the longitudinal direction of the photovoltaic cell module line M2. In the following, the first to fourth photovoltaic cell modules will be denoted simply as photovoltaic cell modules 4A to 4D.

Moreover, a site where the securing fixture 5 is arranged is on the upstream side of each of the four photovoltaic cell modules, and is a position where corner portions K of the four photovoltaic cell modules are adjacent to each other.

The securing fixture 5 according to the embodiment includes a base part 50, a first holding part 500A and a second holding part 500B. Each of the first holding part 500A and the second holding part 500B includes a wall part 50c, a first protrusion 51, a placing part 52, a second protrusion 53, an arm part 54, a supporting member 6, and a clamp 7.

The base part 50 has an abutting part 50a that abuts on the trestle 3, and the base part 50 is fixed to the trestle 3 that is arranged on the arrow Y2 side. Moreover, the base part 50 has a guide member 50b that protrudes on the trestle 3 side and guides the base part 50 slidably on an upper surface 3a of the trestle 3 along a longitudinal direction of the trestle 3, in one side end portion of the abutting part 50a in a transverse direction of the abutting part 50a (direction of arrow Z1 to arrow Z2). Thus, when the base part 50 is fixed on the upper surface 3a of the trestle 3, the guide member 50b makes it easy to position the securing fixture 5.

The first holding part 500A and the second holding part 500B are arranged on the abutting part 50a (base part 50) separated from each other, and configured so as to be linearly symmetric viewed from above. Note that a symmetry axis of the linear symmetry is located so that the symmetry axis extends in parallel to a direction of extension of the abutting part 50a (direction of extension of the trestle 3). Thus, in the case where it is not necessary to distinguish the first holding part 500A from the second holding part 500B, the first and second holding part 500A and 500B will be simply referred to as holding parts 500. In the following, configurations of the holding part 500 will be described.

The wall part 50c stands from the abutting part 50a so as to be orthogonal to the abutting part 50a.

The first protrusion 51 is a protruding piece that protrudes from an upper edge portion (arrow Y1 side) of the wall part 50c in a direction opposite to the abutting part 50a. On one holding part 500, two first protrusions 51 are formed so that the placing part 52 is sandwiched between the first protrusions 51, which will be described later. Thus, the securing fixture 5, illustrated in the drawing, is provided with four first protrusions in total.

As illustrated in FIG. 2, the first protrusion 51 abuts on the inner corner portion K2 formed by the horizontal edge 41 and the vertical edge 42. The first protrusion 51 abuts, as illustrated in FIG. 2, on both an inner side surface 41a of the horizontal edge 41 and an inner side surface 42a of the vertical edge 42. Thus, the first protrusion 51 of the securing fixture 5 is caught by the inner corner portion K2 of the photovoltaic cell module 4 motion in two directions, a direction toward the downstream side of the photovoltaic cell module 4 and one of the directions orthogonal to the direction which is toward the downstream side (direction of arrow X1), is restricted and thereby the photovoltaic cell module 4 is positioned.

The placing part 52 is arranged continuously from an upper edge portion of the wall part 50c (arrow Y1 side) bending toward the downstream side, and extends in a direction of the downstream side of the photovoltaic cell module 4. The placing part 52 slopes in a direction in which a tip portion of the placing part 52 approaches the abutting part 50a (downward), and the vertical edge 42, as the second frame member, is placed on an upper surface of the placing part 52. Note that the placing part 52 of the first holding part 500A and the placing part 52 of the second holding part 500B extend so as to be separated from each other.

On an upper surface of the placing part 52 arranged on the arrow Z2 side, the vertical edges 42 of the photovoltaic cell modules 4A and 4B adjacent to each other in the longitudinal direction of the photovoltaic cell module line M1 are placed. Moreover, on an upper surface of the placing part 52 arranged on the arrow Z1 side, the vertical edges 42 of the photovoltaic cell modules 4C and 4D adjacent to each other in the longitudinal direction of the photovoltaic cell module line M2 are placed.

Moreover, the placing part 52 has a bolt hole 52a, through which a supporting member 6 (described later) and the clamp 7 can be connected to the placing part 52 by a common bolt (fastening member).

The second protrusion 53 is formed so as to extend continuously from the placing part 52 and protrude in a direction opposite to the abutting part 50a (upward). The second protrusion 53, illustrated in the drawings, is formed so as to extend continuously from a tip portion of the placing part 52, but the present invention is not limited to this.

The second protrusion 53 is arranged at a position so as to abut on an outer side surface 42b of the vertical edge 42, as illustrated in FIG. 2. Then, the vertical edge 42 configuring the photovoltaic cell module 4 is clamped between the first protrusion 51 and the second protrusion 53. Thus, the photovoltaic cell module 4 can be positioned by regulating motions of the photovoltaic cell module 4 in three directions, a direction of downstream side (the arrow Z1 direction or the arrow Z2 direction), and two directions orthogonal to the direction of downstream side (the arrow X2 direction and the arrow X1 direction).

Figure 12:
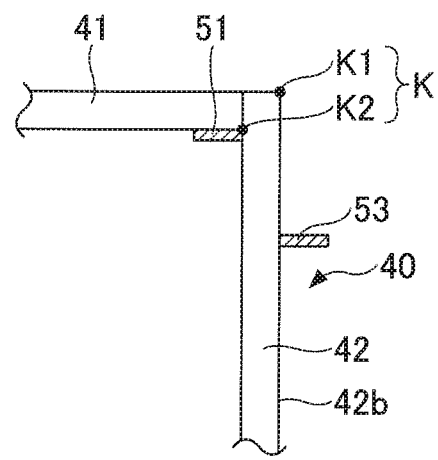
FIG. 12 is a top view schematically depicting a relation between the frame member and the securing fixture of the photovoltaic cell module according to the first embodiment.
Figure 12:
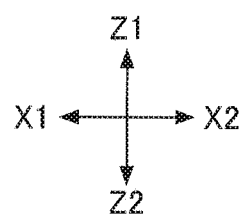

FIG. 12 is a top view schematically depicting a relation between the frame member 40 and the securing fixture 5 in the photovoltaic cell module 4 according to the embodiment. In FIG. 12, the arrow Z2 direction is a direction of downstream side. Moreover, in FIG. 12, for simplicity, only the horizontal edge 41 and the vertical edge 42 of the photovoltaic cell module 4, and the first protrusion 51 and the second protrusion 53 of the securing fixture 5 will be shown. The first protrusion 51 abuts on an inner corner portion K2 formed by the horizontal edge 41 and the vertical edge 42. The second protrusion 53 is arranged at a position abutting on the outer side surface 42b of the vertical edge 42. That is, the vertical edge 42 configuring the photovoltaic cell module 4 is clamped between the first protrusion 51 and the second protrusion 53. The frame member 40 is clamped between the first protrusion 51 and the second protrusion 53, in the arrow X1 direction and the arrow X2 direction, and a position in the direction is restricted. Moreover, because the first protrusion 51 abuts on the inner corner portion K2 formed by the horizontal edge 41 and the vertical edge 42, a position of the frame member 40 in the direction of the downstream side (the arrow Z2 direction) is also restricted.

The securing fixture 5 according to the embodiment has four first protrusions and two second protrusions, as illustrated in the drawings. Thus, it is possible to position, by the single securing fixture 5, four photovoltaic cell modules, the photovoltaic cell modules 4A and 4B, which are adjacent to each other in the longitudinal direction of the trestle 3, and the photovoltaic cell modules 4C and 4D, which are adjacent to upstream sides of the photovoltaic cell modules 4A and 4B, respectively, and arranged so as to be symmetric with respect to a line vertically down from a point between upstream side end portions.

The arm part 54 is arranged so as to extend continuously from the placing part 52. Two arm parts 54 are formed in an arrangement so as to be symmetric with respect to an axis line of the placing part 52.

The pair of arm parts 54 has connection parts 54a hanging downwards towards the abutting part 50a, and support arm parts 54b that are orthogonal to the connection parts 54a and extend toward the downstream side of the photovoltaic cell module 4. On an upper edge portion of the support arm part 54b, a notch portion 54c is formed. The pair of arm parts 54 is a support portion for supporting the supporting member 6.

A gap S2 is formed between a lower surface of the placing part 52 and an upper surface of the notch portion 54c of the support arm part 54b. Moreover, a spacing S3 is formed between support arm parts 54b, facing each other.

The supporting member 6 is a support plate for supporting a load when the two vertical edges 42 of the photovoltaic cell module 4 are placed on the upper surface of the placing part 52. The supporting member 6 is arranged at a position immediately below the placing part 52, and supported by the notch portion 54c of the support arm parts 54b of the pair of arm parts 54.

The supporting member 6 has a support plate 61 and a handle part 62. The support plate 61 has a flat portion 61a that can support the lower surface of the placing part 52, and a support portion 61b that is to be placed on the notch portion 54c of the arm part 54, and is formed extending continuously from the arrow X1 side edge portion and the arrow X2 side edge portion of the flat portion 61a.

The supporting member 6 has a bolt hole 61c, through which the placing part 52 and the clamp 7 (described later) can be connected to the supporting member 6 by a common bolt, at an approximately central position.

A width L1 of the flat portion 61a in the arrow X1—the arrow X2 direction, is narrower than a width L2 of the support plate 61. The width L1 is formed so as to be narrower than the spacing S3. The width L2 is formed so as to be wider than the spacing S3. Thus, the support plate 61 of the supporting member 6 supported by the arm parts 54 is movable in the arrow P direction within a range of the spacing S3, as illustrated in FIGS. 5A and 5B. The property is useful for aligning the bolt holes of the supporting member 6, the placing part 52 and the clamp 7 (described later) upon connecting the supporting member 6, the placing part 52 and the clamp 7 by a bolt.

Moreover, at a corner of the support portion 61b, the supporting member 6 has a bending piece 61d formed by bending in a direction opposite to the abutting part 50a. The bending piece 61d encroaches into the lower surface of the vertical edge 42 by fastening by the bolt, and thereby supporting the vertical edge 42 and being used for grounding.

The handle part 62 is a plate formed so as to extend continuously from a downstream side end portion of the support plate 61, and hangs downward in a direction opposite to the placing part 52. The handle part 62 has a width L1 on the support plate 61 side, and a width greater than L1 and less than the spacing S3 on the tip portion side. Because the handle part 62 abuts on the support arm parts 54b, the supporting member 6 is movable only between the support arm parts 54b. Thus, a motion of the supporting member 6 is restricted by the support arm parts 54b.

The clamp 7 has a cross section with an approximately U-shape, and, as illustrated in FIGS. 2 and 4, is installed on the upper surface of the placing part 52, and clamps the photovoltaic cell modules 4A and 4B, which are adjacent to each other in the longitudinal direction of the photovoltaic cell module line M1 (or the trestle 3), along with the placing part 52. In the drawings, for convenience of explanation, the clamp 7 that maintains an interval between the photovoltaic cell modules 4A and 4D is omitted. However, the clamp 7 has the same configuration and is arranged at the same position.

The clamp 7 has a bottom surface portion 71, a pair of side surface portions 72 that stands from both end portions of the bottom surface portion 71 and are orthogonal to the bottom surface portion 71, and flange portions 73 extending from upper edge portions of the side surface portions 72 in directions orthogonal to the side surface portions 72. The bottom surface portion 71 has a bolt hole 71a, through which the placing part 52, the supporting member 6 and the clamp 7 (described later) can be connected by a common bolt.

A lower surface of the flange portion 73 is placed on an upper surface of the vertical edge 42 configuring the frame member 40 in a thickness direction of the vertical edge 42, as illustrated in FIG. 2. Note that a lower surface in the thickness direction of the vertical edge 42 is placed on the upper surface of the placing part 52, as described above. Thus, the upper surface and the lower surface of the vertical edge 42 in the thickness direction of the vertical edge 42 are clamped by the placing part 52 and the flange portion 73, and thereby the vertical edge 42 is fixed to the securing fixture 5.

The clamp 7 is arranged on an upstream side of the second protrusion 53. Thus, a motion of the clamp 7 toward the downstream side is restricted by the second protrusion 53 before being fixed by a bolt. That is, it is possible to position the clamp 7 by the second protrusion 53. Note that, similarly, a motion of the clamp 7 in the longitudinal direction of the photovoltaic cell module line M1 (or the trestle 3) is restricted by the vertical edge 42 of the photovoltaic cell modules 4A and 4B, which are adjacent to each other.

In order to position and fix the four photovoltaic cell modules 4 by the securing fixture 5 having the aforementioned configuration, an operator causes each of the four first protrusions 51 of the securing fixture 5 to be caught by one inner corner portion K2 on the upstream side of the photovoltaic cell module 4 formed by the horizontal edge 41 and the vertical edge 42 of the photovoltaic cell module 4. Then, the vertical edge 42 of the photovoltaic cell module 4 is clamped by the first protrusion 51 and the second protrusion 53. Thus, motion of the four photovoltaic cell modules 4 in three directions, a direction of the downstream side of the photovoltaic cell module 4, and two directions orthogonal to the direction of the downstream side of the photovoltaic cell module 4 (the arrow X2 direction and the arrow X1 direction) are restricted by the first protrusion 51 and the second protrusion 53 of the securing fixture 5, and thereby the four photovoltaic cell modules 4 are positioned.

Note that before the photovoltaic cell module 4 is positioned, the supporting member 6 is arranged on the notch portion 54c of the art part 54 in the securing fixture 5 in advance.

After the four photovoltaic cell modules 4 are positioned in the securing fixture 5, the clamp 7 for clamping the photovoltaic cell modules 4A and 4B (and 4C and 4D), which are adjacent to each other, along with the placing part 52, is arranged on an upper surface of each of the placing part 52.

Then, the bolt hole 71a of the clamp 7, the bolt hole 52a of the placing part 52, and the bolt hole 61c of the supporting member 6 are aligned with each other, screwed by a common bolt, and thereby the four corner portions K facing each other in the upstream side end portions of the four photovoltaic cell modules 4 can be fixed integrally.

The aforementioned processes can be performed from the downstream side of the photovoltaic cell module 4. Furthermore, because the operator can position the four photovoltaic cell modules 4 only by causing the inner corner portions K2 of the photovoltaic cell modules 4 to be caught by the first protrusions 51, the workability is excellent.

Because the securing fixture 5 according to the embodiment is arranged on the upstream side of the photovoltaic cell module 4, a durability of the trestle can be prevented from being reduced by rain water or the like flowing down a securing fixture arranged on the downstream side into the trestle, which has been a problem in the related art, and the durability of the trestle can be maintained.

The securing fixture 5 according to the embodiment has the first holding part 500A and the second holding part 500B, the securing fixture 5 has four first protrusions 51, two placing parts 52, two pairs of arm parts 54, two supporting members 6 and two clamps 7; thus, two photovoltaic cell modules 4 (4A and 4B) adjacent to each other in the photovoltaic cell module line M1 and two photovoltaic cell modules 4 (4C and 4D) adjacent to each other in the photovoltaic cell module line M2, i.e. four photovoltaic cell modules 4 in total, can be positioned and fixed by one securing fixture 5.

Figure 7:
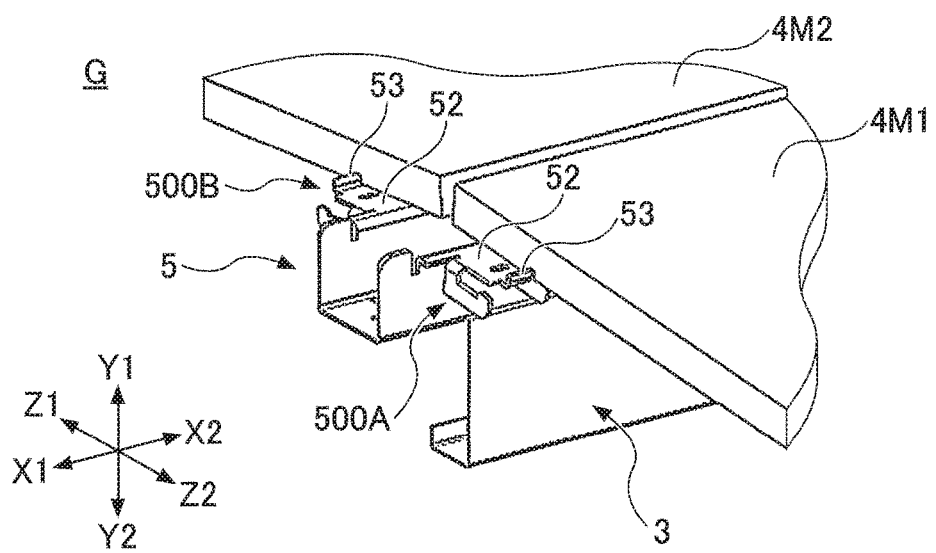
FIG. 7 is a partially enlarged perspective view of an end portion G of the photovoltaic cell module array AR illustrated in FIG. 1.

The securing fixture 5 according to the embodiment can be implemented in a form illustrated in FIG. 7. FIG. 7 is a partially enlarged perspective view of an end portion G of the photovoltaic cell module array AR illustrated in FIG. 1. In FIG. 7, for convenience for explanation, the supporting member 6 and the clamp 7 are omitted.

That is, in the end portion G, the securing fixture 5 positions and fixes a photovoltaic cell module 4M1 arranged in the photovoltaic cell module line M1 and a photovoltaic cell module 4M2 arranged in the photovoltaic cell module line M2, i.e. two photovoltaic cell modules in total. Then, the securing fixture 5 positions and fixes integrally two corner portions K of the upstream side end portions of the photovoltaic cell modules 4M1 and 4M2, facing each other. A configuration of the securing fixture 5 and an arrangement position of the photovoltaic cell module 4 are the same as described above, and explanation thereof will be omitted.

Thus, the securing fixture 5 according to the embodiment can be used both in the end portion position of the photovoltaic cell module lines M1 and M2 and in intermediate positions, and versatility is high.

Second Embodiment

Figure 8:
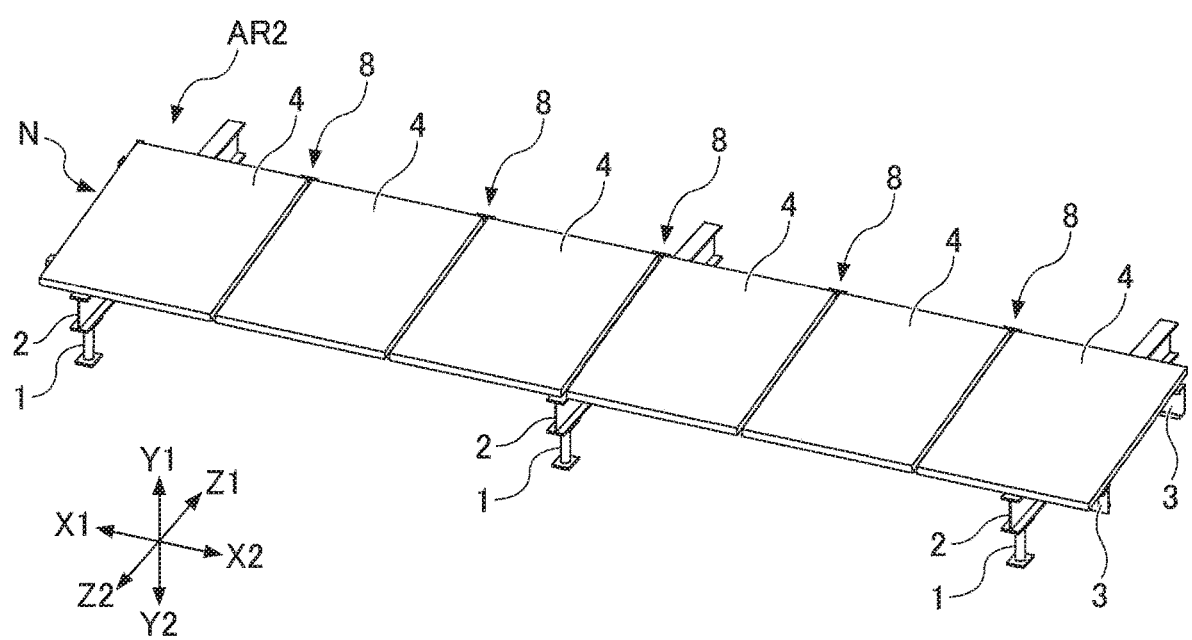
FIG. 8 is a perspective view schematically depicting an example of a photovoltaic cell module array, in which a securing fixture for a photovoltaic cell module according to a second embodiment was implemented, installed on the ground plane.
Figure 9:
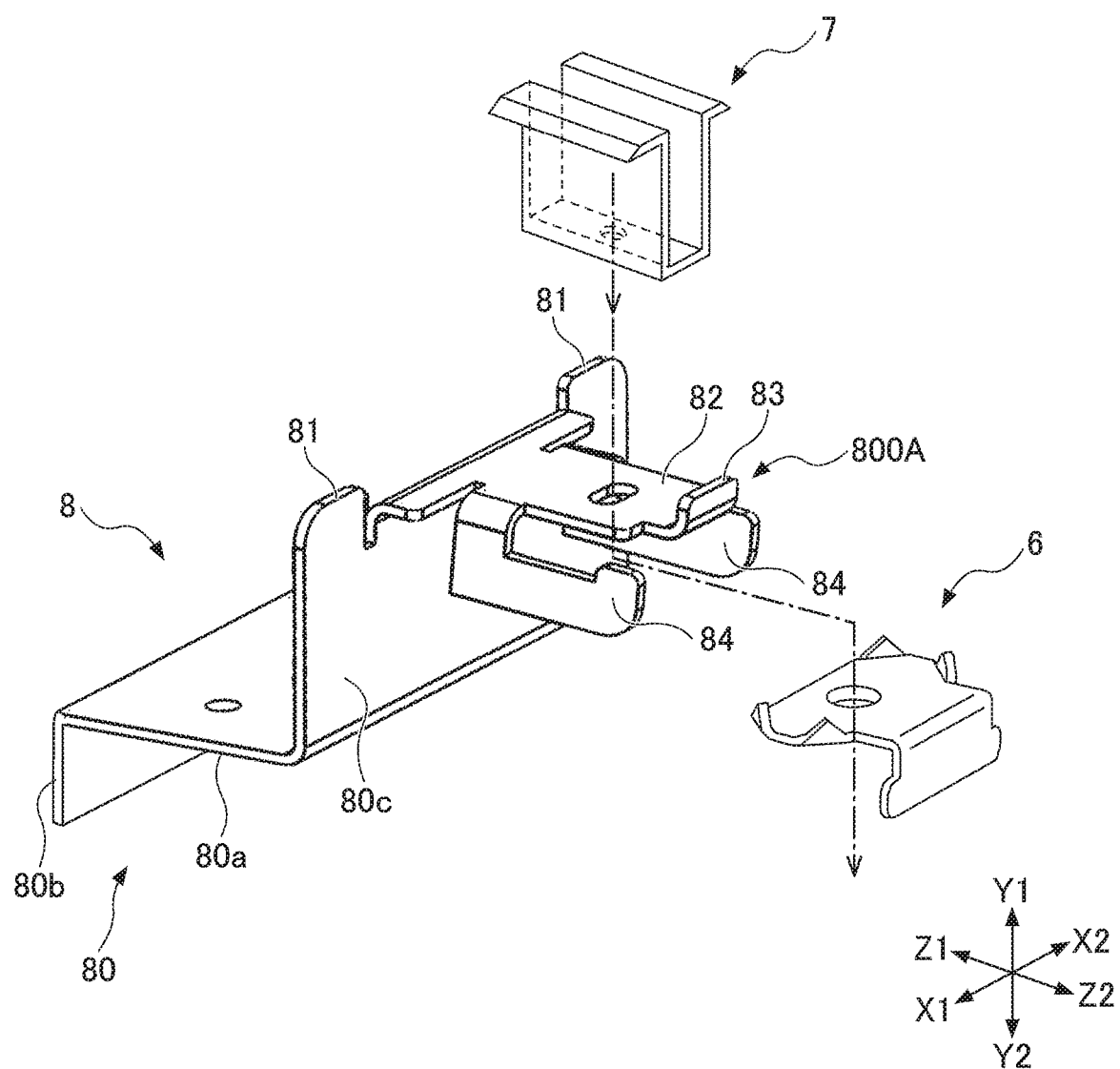
FIG. 9 is an exploded perspective view for describing a configuration of the securing fixture for a photovoltaic cell module according to the second embodiment.

A securing fixture 8 according to a second embodiment will be described with reference to FIGS. 8 and 9. FIG. 8 is a perspective view schematically depicting an example of a photovoltaic cell module array AR2, in which the securing fixture 8 for a photovoltaic cell module 4 according to the second embodiment is implemented, installed on the ground plane. FIG. 9 is an exploded perspective view for describing a configuration of the securing fixture 8 for the photovoltaic cell module 4 according to the second embodiment.

The second embodiment is based on a technical idea that is almost the same as the technical idea of the first embodiment. In the following, a difference from the first embodiment will be described, and common features will be omitted.

The securing fixture 8 according to the second embodiment is implemented in a photovoltaic cell module array AR2 configured only of photovoltaic cell module lines N.

In the photovoltaic cell module line N, a plurality of photovoltaic cell modules 4 are set to have a slope from a horizontal plane by a few degrees, and are adjacent to each other along the longitudinal direction of the trestle 3.

The securing fixture 8 according to the embodiment fixes integrally corner portions K, facing each other, of upstream side end portions of two photovoltaic cell modules 4, which are adjacent to each other along the longitudinal direction of the trestle 3.

The securing fixture 8 has a base part 80 and a first holding part 800A, as illustrated in FIG. 9. The first holding part 800A has a wall part 80c, a first protrusion 81, a placing part 82, a second protrusion 83, an arm part 84, a supporting member 6 and a clamp 7. The base part 80 has an abutting part 80a and a guide member 80b.

Configurations of the base part 80 and the first holding part 800A, described above, are the same as the configurations of the base part 50 and the first holding part 500A according to the first embodiment, illustrated in FIGS. 2 to 6. In the following, the first holding part 800A will be referred simply as a holding part 800.

A difference from the first embodiment is that the holding part 800 is arranged only on the arrow Z2 side in the securing fixture 8. Thus, in the securing fixture 8 according to the embodiment, two first protrusions 81 are formed along the longitudinal direction of the photovoltaic cell module line N (arrow X1 direction–arrow X2 direction).

Moreover, in the securing fixture 8 according to the embodiment, the base part 80 has a guide member 80*b* on one side end portion in the transverse direction (arrow Z1 direction–arrow Z2 direction) of the abutting part 80*a*. The feature is also the same as in the securing fixture 5.

In the embodiment, the operator causes each of the two first protrusions 81 of the securing fixture 8 to be caught by one inner corner portion K2 on the upstream side of the photovoltaic cell module 4, formed by a horizontal edge 41 and a vertical edge 42. Then, the vertical edge 42 of the photovoltaic cell module 4 is clamped by the first protrusion 81 and the second protrusion 83. Thus, a motion of the two photovoltaic cell modules 4 is restricted by the first protrusion 81 and the second protrusion 83 of the securing fixture 8, in the downstream side direction of the photovoltaic cell module 4, and two directions orthogonal to the downstream side direction (arrow X2 direction and arrow X1 direction, in three directions in total, and thereby the photovoltaic cell modules 4 are positioned.

Also in the embodiment, the process of mounting the photovoltaic cell module 4 to the securing fixture 8 can be performed from the downstream side of the photovoltaic cell module 4. Because two photovoltaic cell modules 4 can be positioned only by causing the inner corner portions K2 of the photovoltaic cell modules 4 to be caught by the first protrusions 81, the workability is excellent.

Third Embodiment

Figure 10A:
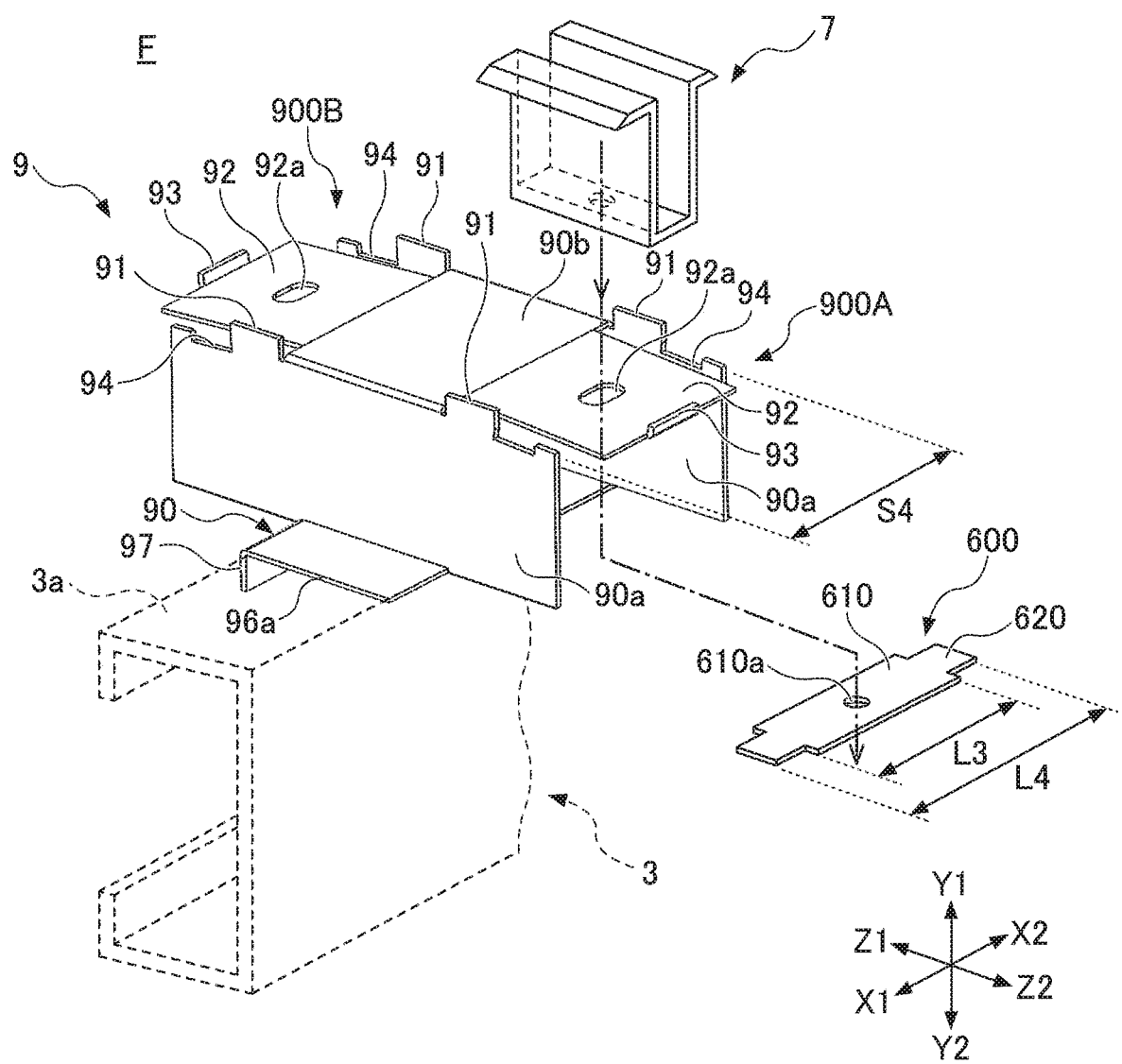
FIG. 10A is an exploded perspective view for describing a securing fixture for a photovoltaic cell module according to a third embodiment.
Figure 10B:
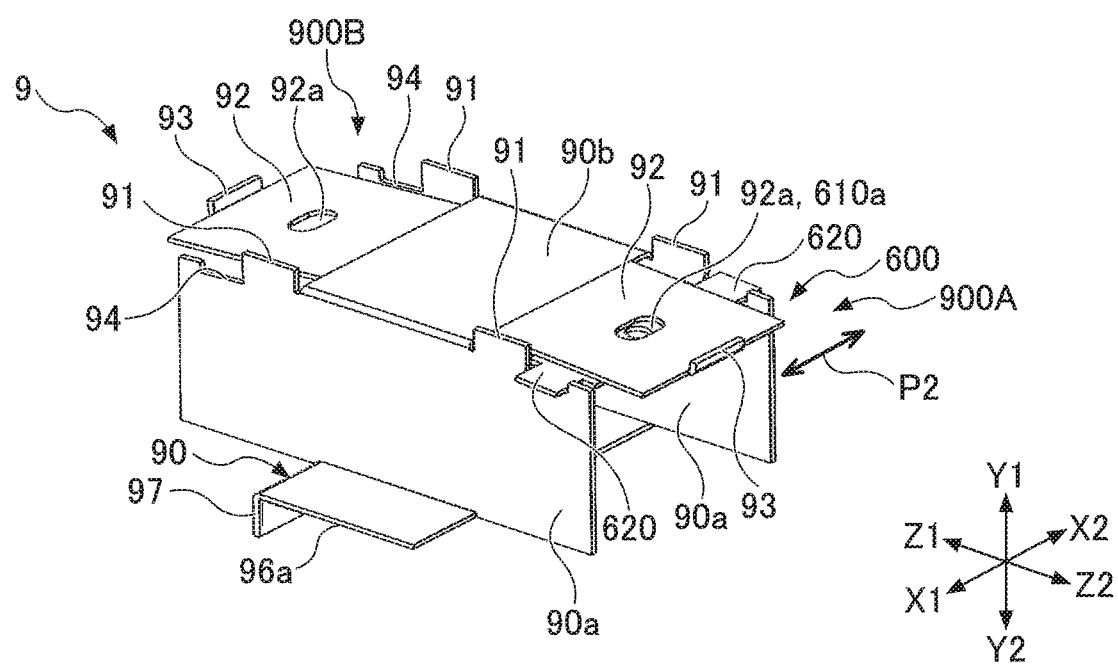
FIG. 10B is a top perspective view for describing the securing fixture for a photovoltaic cell module according to the third embodiment.
Figure 11:
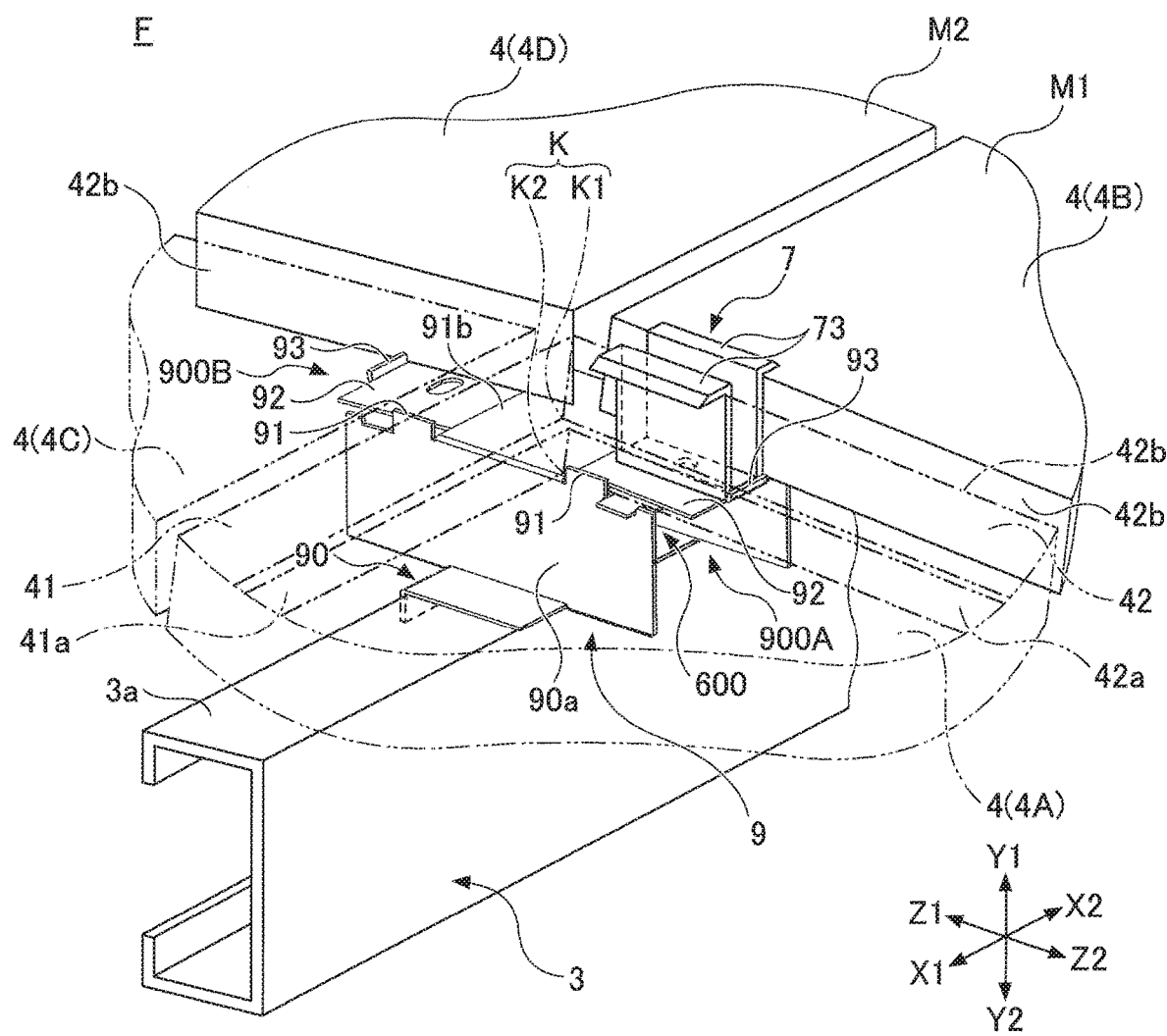
FIG. 11 is a partially enlarged perspective view depicting an example of a part "F" of the photovoltaic cell module array, illustrated in FIG. 1, in which the securing fixture for a photovoltaic cell module according to the third embodiment was implemented.

A securing fixture according to a third embodiment is illustrated in FIGS. 10A, 10B and 11. FIG. 10A is an exploded perspective view for describing the securing fixture 9 for a photovoltaic cell module 4 according to the third embodiment. FIG. 10B is a top perspective view for describing the securing fixture 9, to which a supporting member 600 is attached. FIG. 11 is a partially enlarged perspective view depicting an example of a part "F", illustrated in FIG. 1, in which the securing fixture 9 for a photovoltaic cell module 4 according to the third embodiment is implemented. Note that in FIG. 11, for convenience of explanation, as in FIG. 2, a photovoltaic cell module 4C on the arrow X1 side and the arrow Z1 side will be omitted, and a photovoltaic cell module 4A on the arrow X1 side and the arrow Z2 side will be illustrated as a transparent view.

The third embodiment is based on a technical idea that is almost the same as the technical idea of the first embodiment. In the following, a difference from the first embodiment will be described, and common features will be omitted. Moreover, the securing fixture 9 according to the embodiment may be implemented in the photovoltaic cell module array AR, illustrated in FIGS. 1 and 2.

The securing fixture 9 has a base part 90, a first holding part 900A and a second holding part 900B. Each of the first holding part 900A and the second holding part 900B has a wall part 90*a*, a first protrusion 91, a placing part 92, a second protrusion 93, a supporting member 600 and a clamp 7. The clamp 7 according to the embodiment is the same as the clamps 7 according to the first and second embodiments. Moreover, a configuration of the photovoltaic cell module 4 fixed by the securing fixture 9 is the same as the configurations of the photovoltaic cell modules 4 according to the first and second embodiments. That is, by the horizontal edge 41 and the vertical side 42, which configure the photovoltaic cell module 4, corner portions K are formed at four sites. Outer corner portions K1 and inner corner portions K2 are also formed at four sites. Moreover, also in the embodiment, the first protrusion 91 of the securing fixture 9 is caused to be caught by one inner corner portion K2 on the upstream side of the photovoltaic cell module 4 formed by a horizontal edge 41 and a vertical edge 42 of the photovoltaic cell module 4.

The base part 90 has an abutting part 96*a* abutting on an upper surface 3*a* of a trestle 3, and a guide member 97 hanging from one side end portion of the abutting part 96*a* on the trestle 3 side. The guide member 97 has the same function as the guide member 50*b* according to the first embodiment.

In the same way as the securing fixture 5 according to the first embodiment, the first holding part 900A is in line symmetry with the second holding part 900B, viewed from above. Note that a symmetry axis of the linear symmetry is located so that the symmetry axis extends in a direction orthogonal to a direction in which the abutting part 96*a* extends (the trestle 3 extends). Thus, only the configuration of the first holding part 900A will be described. The first holding part 900A has two wall parts 90*a* standing from the abutting part 96*a* at a predetermined distance in the longitudinal direction of the trestle 3 (arrow X1 direction–X2 direction), and a connection piece 90*b* for connecting the wall parts 90*a*. The wall parts 90*a* are arranged along the transverse direction of the trestle 3 (arrow Z1 direction–Z2 direction). The wall parts 90*a* and the connection piece 90*b* are shared by the first holding part 900A and the second holding part 900B. That is, the two wall parts 90*a* with the connection piece 90*b* are installed with respect to the range of both of the first holding part 900A and the second holding part 900B.

The connection piece 90*b* is a plate arranged at an approximately central position (around the symmetry axis) of an upper edge portion of each of the two wall parts 90*a*, and connecting the wall parts 90*a*.

The first protrusion 91 protrudes from the upper edge portion of the wall part 90*a* in a direction opposite to the abutting part 96*a*. Two first protrusions 91 are formed for the upper edge portion of one wall part 90*a* at a predetermined distance. Because two wall parts 90*a* are present in the embodiment, four first protrusions 91 according to the embodiment are formed in total. One holding part 900 has one of the first protrusions 91 protruding from each of the wall parts 90*a*, i.e. two first protrusions 91 in total. The reason why four first protrusions 91 are present in two holding parts 900 is that, in the same way as in the first embodiment, the photovoltaic cell modules 4A and 4B, which are adjacent to each other in the longitudinal direction of the trestle 3, the photovoltaic cell module 4C adjacent to the upstream side of the photovoltaic cell module 4A, and the photovoltaic cell module 4D adjacent to the upstream side of the photovoltaic cell module 4B, i.e. four photovoltaic cell modules 4 are positioned and fixed by one securing fixture 9.

Note that between two first protrusions 91 formed on the upper edge portion of each of the wall parts 90*a*, the aforementioned connection piece 90*b* is arranged.

Moreover, on the upper edge portion of each of the wall parts 90*a*, a notch portion 94 for supporting a supporting member 600, which will be described later, and for functioning as a supporting portion, is formed. The notch portion 94 is arranged on a downstream side of the first protrusion 91.

The placing part 92 is formed continuously from the connection piece 90b, located between the wall parts 90a, and extends in a direction toward the downstream side of the photovoltaic cell module 4. The placing part 92 slopes in a direction in which a tip portion of the placing part 92 approaches the abutting part 96a, and the vertical edge 42, as the second frame member, is placed on an upper surface of the placing part 92.

The placing part 92, illustrated in the drawings, is formed continuously from an arrow Z1 side end portion and an arrow Z2 side end portion of the connection piece 90b. The placing part 92 of the first holding part 900A and the placing part 92 of the second holding part 900B are arranged so as to be opposite each other. Thus, in the same way as in the first embodiment, two second protrusions 93, two supporting members 600, and two clamps 7 are also arranged in the mode of being opposite each other with respect to a longitudinal direction of the connection piece 90b.

On an upper surface of the placing part 92 arranged on the arrow Z2 side, as illustrated in FIG. 11, the vertical edges 42 of the photovoltaic cell modules 4A and 4B adjacent to each other in the longitudinal direction of the photovoltaic cell module line M1, are placed. Moreover, on an upper surface of the placing part 92 arranged on the arrow Z1 side, the vertical edges 42 of the photovoltaic cell modules 4C and 4D adjacent each other in the longitudinal direction of the photovoltaic cell module line M2, are placed.

Moreover, the placing part 92 has a bolt hole 92a, through which the supporting member 600 (described later) and the clamp 7 can be connected to the placing part 92 by a common bolt. The bolt hole 92a is an elongated hole to facilitate an alignment of the bolt hole 92a, the bolt hole of the supporting member 600 (described later) and the bolt hole of the clamp 7 (See FIG. 10B).

In the placing part 92, a second protrusion 93 protruding in a direction opposite to the abutting part 96a is formed. The second protrusion 93 has almost the same configuration as the second protrusion 53 according to the first embodiment.

The supporting member 600 is a supporting plate for supporting a load when the vertical edges 42 of the two photovoltaic cell modules 4 are placed on the upper surface of the placing part 92. The supporting member 600 is arranged at a position immediately below the placing part 92, as illustrated in FIG. 10B, so as to be supported by the notch portion 94 formed in the upper edge portion of each of the two wall parts 90a.

The supporting member 600 has a flat portion 610 that can support a lower surface of the placing part 92; and a supporting portion 620 to be placed on the notch portion 94, formed continuously from an arrow X1 side end portion and an arrow X2 side end portion of the flat portion 610. The supporting member 600 has a bolt hole 610a, through which the placing part 92 and the clamp 7 can be connected to the supporting member 600 by a common bolt, at an approximately central position of the flat portion 610.

A width L3 of the flat portion 610, in the arrow X1–arrow X2 direction, is narrower than a width L4 of the supporting member 600. The width L3 is formed so as to be narrower than the distance S4 between the wall parts 90a. The width L4 is formed so as to be wider than the distance S4. Thus, the flat portion 610 of the supporting member 600 is movable in an arrow P2 direction within the range of the distance S4 (See FIG. 10B).

The clamp 7 is arranged on the upstream side of the second protrusion 93. Thus, a motion of the clamp 7 is restricted by the second protrusion 93 toward the downstream side before the clamp 7 is fixed. That is, the clamp 7 can be positioned.

In order to position and fix the four photovoltaic cell modules 4 by the securing fixture 9 having the aforementioned configuration, the operator causes each of the four first protrusions 91 of the securing fixture 9 to be caught by one inner corner portion K2 on the upstream side of the photovoltaic cell module 4 formed by the horizontal edge 41 and the vertical edge 42 of the photovoltaic cell module 4. Then, the vertical edge 42 of the photovoltaic cell module 4 is clamped by the first protrusion 91 and the second protrusion 93. Thus, motions of the four photovoltaic cell modules 4 in three directions, a direction of the downstream side of the photovoltaic cell module 4, and two directions orthogonal to the direction of the downstream side of the photovoltaic cell module 4 (the arrow X2 direction and the arrow X1 direction) are restricted by the first protrusion 91 and the second protrusion 93 of the securing fixture 9, and thereby the four photovoltaic cell modules 4 are positioned.

Afterwards, on the upper surfaces of the two placing parts, the clamp 7 for holding the distance between the photovoltaic cell modules 4A and 4B, which are adjacent to each other, and the clamp 7 for holding the distance between the photovoltaic cell modules 4C and 4D, which are adjacent to each other are arranged. Then, the bolt hole 71a of the clamp 7, the bolt hole 92a of the placing part 92, and the bolt hole 610a of the supporting member 600 are aligned with each other, screwed together by a common bolt, and thereby the four corner portions K facing each other in the upstream side end portions of the four photovoltaic cell modules 4 can be fixed integrally.

The aforementioned processes can be performed from the downstream side of the photovoltaic cell module 4. Furthermore, because the operator can position the four photovoltaic cell modules 4 only by causing the inner corner portions K2 of the photovoltaic cell modules 4 to be caught by the first protrusions 91, the workability is excellent.

As described above, embodiments have been described in detail. However, the present invention is not limited to the embodiments. Various variations and replacements may be added to the aforementioned embodiments without departing from the scope of claims. For example, the case where the securing fixture according to the present invention is implemented in a photovoltaic cell module array formed on the ground plane has been illustrated, however the securing fixture can be implemented also in a photovoltaic cell module array formed on a flat roof or a sloping roof.

Moreover, in the third embodiment, the case where the securing fixture 9, in which the first holding part 900A and the second holding part 900B are arranged, positions and fixes the four photovoltaic cell modules 4 has been illustrated. However, the present invention is not limited to this case, and the securing fixture 9, in which only the first holding part 900A is arranged, may be applied to the photovoltaic cell module array AR2 according to the second embodiment, illustrated in FIGS. 8 and 9.

The present application is based on and claims the benefit of priority of Japanese Priority Application No. 2016-133647 filed on Jul. 5, 2016, the entire contents of which are hereby incorporated by reference.

REFERENCE SIGNS LIST 1 base
2 support rail 3 trestle
4 photovoltaic cell module
40 frame member
5 securing fixture
500 holding part
50 base part
50a abutting part
50c wall part
51 first protrusion
52 placing part
53 second protrusion
54 arm part
54a notch portion
6 supporting member
7 clamp
K corner portion

What is claimed is:

1. A securing fixture for a photovoltaic cell module that includes a first frame member that extends in a first direction; and a second frame member that extends in a second direction and is adjacent to the first frame member, the second direction being orthogonal to the first direction, the securing fixture being enclosed by the first frame member and the second frame member having a corner portion formed by the first frame member and the second frame member,
the securing fixture comprising:
an abutting part that is fixed to a trestle and abuts on the trestle; and
a holding part that holds the photovoltaic cell module, including
a first protrusion that protrudes in a direction opposite to the abutting part, wherein a gap enclosed by the first frame member and the second frame member is formed inside the first frame member and the second frame member, and the first protrusion abuts on inner side surfaces of the first frame member and the second frame member, the inner side surfaces including the corner portion formed in the gap inside the first frame member and the second frame member, and
a placing part on which the second frame member is placed.

2. The securing fixture for the photovoltaic cell module according to claim 1,
wherein the holding part includes a second protrusion that protrudes from the placing part in a direction opposite to the abutting part, and abuts on an outer side surface of the second frame member, and
wherein the second frame member is clamped by the first protrusion and the second protrusion.

3. The securing fixture for the photovoltaic cell module according to claim 1,
wherein the placing part slopes in a direction in which a tip portion of the placing part approaches the abutting part.

4. The securing fixture for the photovoltaic cell module according to claim 1, further comprising:
a supporting member arranged immediately below the placing part; and
a support portion for supporting the supporting member from below the placing part.

5. The securing fixture for the photovoltaic cell module according to claim 1,
wherein the holding part has a wall part that stands from the abutting part,
wherein the first protrusion is formed so as to protrude from an upper edge portion of the wall part in a direction opposite to the abutting part, and
wherein the placing part is provided by bending from the upper edge portion of the wall part.

6. The securing fixture for the photovoltaic cell module according to claim 5,
wherein two first protrusions are provided so that the placing part is sandwiched between the two first protrusions, the two first protrusions being two of the first protrusion.

7. The securing fixture for the photovoltaic cell module according to claim 5 further comprising:
a supporting member arranged immediately below the placing part; and
two arm parts that are connected to the placing part, and that are support portions for supporting the supporting member from below the placing part.

8. The securing fixture for the photovoltaic cell module according to claim 5,
wherein two holding parts corresponding to the holding part are arranged on the abutting part so as to be linearly symmetric viewed from above.

9. The securing fixture for the photovoltaic cell module according to claim 1,
wherein the holding part has
two wall parts that stand from the abutting part at a distance; and
a connection piece for connecting the wall parts,
wherein the first protrusion is formed so as to protrude from an upper edge portion of each of the two wall parts in a direction opposite to the abutting part,
wherein the placing part is provided to project from the connection piece so as to be located between the two wall parts.

10. The securing fixture for the photovoltaic cell module according to claim 9 further comprising:
a supporting member arranged immediately below the placing part; and
notch portions that are provided in the two wall parts, and that are support portions for supporting the supporting member from below the placing part.

11. The securing fixture for the photovoltaic cell module according to claim 9,
wherein the two holding parts are arranged on the abutting part so as to be linearly symmetric viewed from above, and
wherein the two holding parts share the two wall parts and the connection piece.

12. The securing fixture for the photovoltaic cell module according to claim 1, further comprising:
a clamp that is arranged on an upper surface of the placing part, and that clamps the photovoltaic cell module along with the placing part.

13. The securing fixture for the photovoltaic cell module according to claim 1, further comprising:
a guide member that guides the securing fixture slidably on an upper surface of the trestle along a longitudinal direction of the trestle.

* * * * *